United States Patent [19]

Kraft et al.

[11] 4,160,793

[45] Jul. 10, 1979

[54] FIRE RETARDANT BLEND OF INTERPOLYMER COMPOSITION, CHLORINATED VINYL CHLORIDE POLYMER AND VINYL CHLORIDE POLYMER

[75] Inventors: Paul Kraft, South Spring Valley; Joseph Silberberg, Brooklyn, both of N.Y.

[73] Assignee: Stauffer Chemical Company, Westport, Conn.

[21] Appl. No.: 937,230

[22] Filed: Aug. 28, 1978

[51] Int. Cl.$^2$ ............................................. C08L 33/20
[52] U.S. Cl. ............................ 525/230; 260/45.75 B; 260/45.75 K; 528/85
[58] Field of Search ................................. 260/876 R

[56] References Cited

U.S. PATENT DOCUMENTS

| | | | |
|---|---|---|---|
| 3,639,526 | 2/1972 | Kameishi | 260/891 |
| 3,655,826 | 4/1972 | Fellmann et al. | 260/876 R |
| 3,944,631 | 3/1976 | Yu et al. | 260/881 |

*Primary Examiner*—Carman J. Seccuro
*Attorney, Agent, or Firm*—Richard P. Fennelly

[57] ABSTRACT

Flame retardant blends having good impact resistance and a high heat deflection temperature which comprise: (1) an interpolymer comprising: (a) crosslinked (meth)acrylate; (b) crosslinked styrene-acrylonitrile; and (c) uncrosslinked styrene-acrylonitrile polymeric components; (2) a chlorinated vinyl chloride polymer; and (3) a vinyl chloride polymer. The blends have utility as an outdoor construction material for the construction industry, for example, for residential siding, gutter systems, shutters and the like. The amount of the interpolymer (1) which is present in the blend predominates over the respective weight amounts of either of the two other components (2) or (3).

6 Claims, No Drawings

FIRE RETARDANT BLEND OF INTERPOLYMER COMPOSITION, CHLORINATED VINYL CHLORIDE POLYMER AND VINYL CHLORIDE POLYMER

BACKGROUND OF THE INVENTION

1. Field of the Invention

The present invention relates to a flame retardand blend of three types of polymer components. The blend has good impact resistance and a high heat deflection temperature so as to be useful as an outdoor construction material.

2. Description of the Prior Art

Impact resistant, weatherable polymer compositions comprising acrylate, styrene, and acrylonitrile components are known. Thus, U.S. Pat. No. 3,944,631 to A.J. Yu et al., which discloses one of the components of the type of blend of the present invention, describes an interpolymer comprising: (a) crosslinked (meth)acrylate; (b) crosslinked styrene-acrylonitrile; and (c) uncrosslinked styrene-acrylonitrile polymeric components. This material is said to have superior weather resistance as compared to ABS polymers and is only taught for use by itself without blending with other polymeric materials.

Two-component blends of a thermoplastic polymer (such as PVC or CPVC) and an acrylate-containing impact modifier, heat distortion temperature improver, and process aid are described in U.S. Pat. No. 3,655,826 to R.P. Fellmann et al. Two-component blends of CPVC and MBS (styrene-methyl methacrylate-butadiene) resins are described in U.S. Pat. No. 3,646,163 to S. Taima et al., with the use of ABS in such blends being discouraged.

Finally, three-component blends of CPVC, PVC and either ABS or MBS are suggested in U.S. Pat. No. 3,639,526 to M. Kameishi. The latter two components are present in lower amount than the CPVC resin and are merely intended to be impact modifiers for the CPVC component.

SUMMARY OF THE PRESENT INVENTION

The present invention relates to flame retardant blends having good impact resistance and a high heat deflection temperature which comprise: (1) an interpolymer comprising: (a) crosslinked (meth)acrylate; (b) crosslinked styrene-acrylonitrile; and (c) uncrosslinked styrene-acrylonitrile polymeric components; (2) a vinyl chloride polymer, such as polyvinyl chloride (PVC); and (3) a chlorinated vinyl chloride polymer, such as, chlorinated polyvinyl chloride (CPVC). The amount of the interpolymer (1) predominates over the weight amounts of either of the other two ingredients (2) and (3) in the blend.

DESCRIPTION OF PREFERRED EMBODIMENTS

The terminology "interpolymer comprising crosslinked (meth)acrylate, crosslinked styrene-acrylonitrile, and uncrosslinked styrene-acrylonitrile components" is meant to encompass the type of interpolymer compositions described and claimed in U.S. Pat. No. 3,944,631 to A. J. Yu et al. These interpolymer compositions are formed by a three-step, sequential polymerization process, as follows:

1. emulsion polymerizing a monomer charge (herein designated "(meth)acrylate", for purposes of the present invention), of at least one $C_2$–$C_{10}$ alkyl acrylate, $C_8$–$C_{22}$ alkyl methacrylate, or compatible mixtures thereof, in an aqueous polymerization medium in the presence of an effective amount of a suitable di- or polyethylenically unsaturated crosslinking agent for such a monomer, with the $C_4$–$C_8$ alkyl acrylates being the preferred (meth)acrylate monomers for use in this step;

2. emulsion polymerizing a monomer charge of styrene and acrylonitrile in an aqueous polymerization medium, also in the presence of an effective amount of a suitable di- or polyethylenically unsaturated crosslinking agent for such a monomer, said polymerization being carried out in the presence of the product from Step 1 so that the cross-linked (meth)acrylate and cross-linked styrene-acrylonitrile components form an interpolymer wherein the respective phases surround and penetrate one another; and 3. either emulsion of suspension polymerizing a monomer charge of styrene and acrylonitrile, in the absence of a crosslinking agent, in the presence of the product resulting from Step 2. If desired, Steps 1 and 2 can be reversed in the above described procedure.

This product, which is used as the predominant ingredient in the blend of the present invention, comprises from about 5% to about 50%, by weight, of at least one of the above-identified crosslinked (meth)acrylates, from about 5% to about 35%, by weight, of the cross-linked styrene-acrylonitrile component and from about 15% to about 90%, by weight, of the uncrosslinked styrene-acrylonitrile component. It contains little graft polymerization between the styrene-acrylonitrile copolymer segments and the crosslinked (meth)acrylate polymeric component, and it has an optimum processing range of from about 199° C. to about 232.2° C. due to the presence of potentially varying amounts of three differing polymer phases in the composition. Further details regarding this type of polymer composition can be found in U.S. Pat. No. 3,944,631 to A. J. Yu et al., which is incorporated herein by reference.

The terminology "vinyl chloride polymer" as used herein is meant to encompass polyvinyl chloride homopolymers, as well as the copolymers of vinyl chloride with comonomers polymerizable therewith, with the former monomer predominating the latter in amount. Such comonomers include vinyl esters of carboxylic acids, such as vinyl acetate, the $C_1$–$C_{20}$ alkyl esters of acrylic and methacrylic acid, the aryl, halo- and nitrosubstituted benzyl esters of acrylic and methacrylic acid, the ethylenically unsaturated mono- and dicarboxylic acids, and the like.

The terminology "chlorinated vinyl chloride polymers" is meant to encompass the polymeric material formed by post-chlorinating any of the aforementioned vinyl chloride polymers by any of the well-known means for chlorination of such resins, e.g., the gas phase method, the liquid phase method, the suspension method, or any other similar method. Generally, such chlorinated polymers will contain from about 56% to about 70% chlorine, by weight.

The respective weight amounts of the three above-described components of the blends of this invention can be varied within the following weight percentages (based on the weight of the entire blend): interpolymer: from about 40% to about 90%; vinyl chloride polymer: from about 5% to about 30%; and chlorinated vinyl chloride polymer: from about 5% to about 30%. Preferred blends generally will comprise from about 40% to about 60%, by weight, of the interpolymer, from about 25% to about 35%, by weight of the vinyl chloride, and from about 15% to about 25%, by weight of the chlorinated vinyl chloride polymer. The interpolymer component in these blends is primarily responsible for the good impact resistance and heat distortion values for the blend, whereas the chlorinated vinyl chloride polymer provides improved heat distortion properties, and it, along with the vinyl chloride polymer, are responsible for the flame retardancy of the blend. Commercially significant blends having a heat deflection temperature of 80° C. or greater and an Izod impact of 534 Joules/meter can be formulated. These blends will generally contain greater than 40% by weight of the interpolymer with the weight ratio of vinyl chloride polymer to chlorinated vinyl chloride polymer being about 60/40. Thus, compositions can be formulated comprising the interpolymer, vinyl chloride polymer, and chlorinated vinyl chloride polymer according to the weight ratios described before in admixture with suitable stabilizers and lubricants. These compositions will have good processability, will be flame retardant or resistant in accordance with Underwriter's Laboratories UL 94-vertical test (V-O rating for an 0.318 cm. thickness), will have good Izod impact strength (e.g., greater than 534 J/m), and will have a heat deflection temperature (by ASTM D648 at 1.82 MPa) of greater than about 80° C. Such a property profile renders the compositions suitable as a construction material for such uses as siding, roofing, gutter systems, shutters, pipe, and the like. In order for the above-described property profile to be achieved using a blend of only the interpolymer and vinyl chloride polymer, a higher percentage of interpolymer would be required and antimony trioxide or other suitable flame retardant would have to be included in the formulation. Such a two-component, polymeric blend would not possess the strength and stiffness characteristics of the blends of the present invention.

In addition to the three aforementioned components, the compositions of the present invention can contain other additives, which enhance specific desired properties of the compositions. Representative additives include heat and light stabilizers, antioxidants, fillers (e.g., calcium carbonate, clay, etc.), reinforcing agents (e.g., glass fibers), additional flame retardant and/or smoke suppressant additives (e.g., antimony oxide, aluminum trihydrate, etc.), and pigments (e.g., titanium dioxide, carbon black, etc.).

The blends of this invention can be formulated from the components thereof by any of the commonly used compounding techniques including single or twin screw extrusion, two-roll or Banbury milling, and the like. Shapes or articles can be fabricated from the compounded blends by extrusion, calendering, injection molding, or any other fabrication method which is suitable for thermoplastic resins. Mixtures of the components of the blends may also be fabricated directly into shapes or articles by any method which will suitably compound them in the course of fabrication.

The present invention will be further understood by examination of the following Examples which illustrate certain embodiments of the present invention.

EXAMPLE 1

This Example illustrates the process for making the type interpolymer described in U.S. Pat. No. 3,944,631 to A. J. Yu et al. by a three-step emulsion polymerization procedure, for use in Example 2, which follows:

Step 1: This step illustrates the formation of the crosslinked polybutyl acrylate portion of the interpolymer.

Deionized water (18,813 kg.) was charged into a suitable reactor equipped with an agitator which was turned to a low speed setting. Sodium bicarbonate buffer (7.5 kg.) was added over a period of 1 to 2 minutes, and the agitation was continued to dissolve the buffer. A mixture of a disodium isodecyl sulfosuccinate emulsifier solution (AEROSOL A-268, from American Cyanamid) (5.6 kg.) in deionized water (18.2 kg.) was then added to the reactor. The reactor was then evacuated to a minimum of 50.8 cm. of Hg for 5 minutes, and the reactor environment was purged with nitrogen gas. This evacuation/purging operation was repeated once to insure no oxygen remained to interfere with the polymerization reaction. A mixture of butyl acrylate monomer (1,877 kg.) and butylene glycol diacrylate crosslinker (4.5 kg.) was added to the reactor in two stages. Then additional deionized water (454 kg.) was charged into the reactor to flush the feed lines. The reactor environment was again evacuated and purged. The reaction mixture was heated and maintained at 57° C. past the point of maximum exothermic reaction. The solids content in the reactor was monitored until it exceeded 11%, by weight, which indicated termination of this step.

Step 2: This illustrates the step of forming a composition comprising crosslinked styrene-acrylonitrile and crosslinked polybutyl acrylate components.

Four drums, each containing 127 kg. of styrene, 46.8 kg. of acrylonitrile and 708 gm. of a 54 wt. % solution of divinyl benzene were added to the reactor containing the product of Step 1 after the reactor had been evacuated again. When each drum was about half empty, it was purged with nitrogen so as to avoid air from entering the reactor. The reactor temperature was maintained at 60° C. through the maximum point of exothermic reaction, and the solids content of the latex was monitored until it exceeded 60° C. At this point, the reaction was judged terminated.

Step 3: This step yields the desired interpolymer end-product.

A mixture of 28,000 parts by weight of styrene, 10,356 parts by weight acrylonitrile and 92.05 parts by weight of t-dodecyl mercaptan chain transfer agent were prepared and were heated to 29.4° C. for 30 minutes in a different reactor from the one used in Steps 1 and 2. The reactor containing the polymer latex of Step 2 was evacuated again and ammonium persulfate initiator (4.3 kg.) in deionized water (9.1 kg.) was added to it. To this mixture was then added 95.8 kg. of a sodium lauryl sulfate emulsifier solution (SIPEX UB, from Alcolac, Inc.). Nitrogen gas was added to the reactor, and the contents were mixed for 5 minutes. The styrene-acrylonitrile/t-dodecyl mercaptan mixture was then transferred to the polymerization reactor at the rate of 29.5 kg./min. until 1362 kg. had been added. The solids content in the reactor was monitored. When the exothermic reaction began, an additional 1362 kg. of monomer mixture was added to the reactor at 29.5 kg./min. When this had been added, an additional 1533 kg. portion of monomer mixture was added under the same conditions. Upon termination of this addition step, 136 kg. of deionized water was charged into the reactor to flush the feed lines. The reactor was maintained at 60°-62° C. for an additional 1 hour. When the solids content of the latex exceeded 31.5% by weight, the reaction was complete. The reactor was cooled to 40° C. or less, and the non-liquid space in the reactor was flushed with nitrogen gas. At this point, sodium lauryl sulfate emulsifier (34 kg.) and a 272 kg. solution of butylated hydroxy toluene containing 12.2 kg. of a hindered phenol antioxidant (IRGANOX 1010, from Ciba-Geigy Corp.) was added to short stop the reaction. The resulting mixture was agitated for 15 minutes. The batch was removed, screened to remove any coagulum, and the polymer product was recovered.

EXAMPLE 2

This Example illustrates the procedure used to form a series of blends of polyvinyl chloride homopolymer, chlorinated polyvinyl chloride, and the additive of Example 1.

The three components described above were blended by first mixing the chlorinated polyvinyl chloride and polyvinyl chloride with the lubricant and stabilizers described in the Table given below on a 2-roll mill at 188°-198° C. followed by addition of the additive of Example 1. The amount of additive is given in parts by weight per one hundred parts by weight of resin component.

TABLE

| Resin Component | ADDITIVES | |
|---|---|---|
| | Stearic Acid | Liquid Butyl Tin Stabilizer |
| Polyvinyl Chloride | 0.5 | 3 |
| Chlorinated Polyvinyl Chloride | 0.5 | 2 |

The blended samples were then compression molded at 190° C. and were tested for their various physical properties as follows:

TABLE

| Sample No. | Weight | | |
|---|---|---|---|
| | Additive | PVC | CPVC |
| 1 | 0 | 0 | 100 |
| 2 | 0 | 100 | 0 |
| 3 | 35 | 50 | 15 |
| 4 | 40 | 40 | 20 |
| 5 | 50 | 25 | 25 |
| 6 | 50 | 25 | 15 |
| 7 | 55 | 25 | 20 |
| 8 | 60 | 0 | 40 |
| 9 | 60 | 20 | 20 |
| 10 | 80 | 0 | 20 |
| 11 | 100 | 0 | 0 |

| Sample No. | DTL (°C.) | Flex Modulus (GPa) | Izod Impact* (J/m) |
|---|---|---|---|
| 1 | 95.0 | 2.75 | 16 B |
| 2 | 68.5 | Not measured | 27 B |
| 3 | 77.0 | Not measured | 69 B |
| 4 | 76.5 | 2.16 | 107 B |
| 5 | 82.0 | 2.02 | 379 D |
| 6 | 78.0 | 1.96 | 480 D |
| 7 | 81.5 | 1.94 | 422 D |
| 8 | 87.5 | 1.79 | 374 D |
| 9 | 81.0 | 1.90 | 555 D |
| 10 | 88.0 | 1.63 | 387 D |
| 11 | 86.5 | 1.65 | 379 D |

*the abbreviation "B" indicates brittle fracture, whereas "D" indicates ductile fracture. The following test procedures were used: DTL - ASTM D648 (1.82 MPa force); Flex. Modulus - ASTM D790; and Izod Impact - ASTM D256, Method A (0.318 cm. thickness).

The foregoing Examples are presented to illustrate certain embodiments of the present invention and should not be construed in a limiting sense. The scope of protection that is sought is given in the claims which follow.

What is claimed is:

1. A fire retardant blend having good impact resistance and a high heat deflection temperature comprising:
   (1) a predominant amount of an interpolymer comprising: (a) crosslinked acrylate or methacrylate; (b) crosslinked styrene-acrylonitrile; and (c) uncrosslinked styrene-acrylonitrile components, said interpolymer being prepared by polymerizing styrene and acrylonitrile in the presence of a crosslinked alkyl acrylate or methacrylate polymer in two steps with at least one cross-linking agent being present in only one of the two steps;
   (2) a chlorinated vinyl chloride polymer; and
   (3) a vinyl chloride polymer.

2. A blend as claimed in claim 1 wherein the interpolymer comprises from about 5% to about 50%, by weight of the crosslinked acrylate or methacrylate component, from about 5% to about 35% by weight of the crosslinked styrene-acrylonitrile component, and from about 15% to about 90% by weight of the uncrosslinked styrene-acrylonitrile component.

3. A blend as claimed in claim 1 which comprises from about 40% to about 90%, by weight, of the interpolymer, from about 5% to about 30%, by weight of the vinyl chloride polymer, and from about 5% to about 30% by weight of the chlorinated vinyl chloride polymer.

4. A blend as claimed in claim 1 which comprises from about 40% to about 60%, by weight, of the interpolymer, from about 25% to about 35%, by weight of the vinyl chloride polymer, and from about 15% to about 25% by weight of the chlorinated vinyl chloride polymer.

5. A blend as claimed in claim 2 which comprises from about 40% to about 90%, by weight, of the interpolymer, from about 5% to about 30%, by weight of the vinyl chloride polymer, and from about 5% to about 30% by weight of the chlorinated vinyl chloride polymer.

6. A blend as claimed in claim 2 which comprises from about 40% to about 60%, by weight, of the interpolymer, from about 25% to about 35%, by weight of the vinyl chloride polymer, and from about 15% to about 25% by weight of the chlorinated vinyl chloride polymer.

* * * * *